United States Patent [19]

Streater et al.

[11] 4,307,327

[45] Dec. 22, 1981

[54] CONTROL ARRANGEMENT FOR SINGLE PHASE AC SYSTEMS

[75] Inventors: August L. Streater, Bluffton; John A. Whitney, Fort Wayne, both of Ind.

[73] Assignee: Franklin Electric Co., Inc., Bluffton, Ind.

[21] Appl. No.: 76,498

[22] Filed: Sep. 17, 1979

[51] Int. Cl.³ .............................................. H02P 1/44
[52] U.S. Cl. ...................... 318/786; 318/787
[58] Field of Search ................................ 318/786, 787

[56] References Cited

U.S. PATENT DOCUMENTS

| | | | |
|---|---|---|---|
| 3,573,579 | 4/1971 | Lewus | 318/787 |
| 3,667,017 | 5/1972 | Ramirez | 318/787 |
| 3,766,457 | 10/1973 | Fink, Jr. et al. | 318/786 |
| 3,777,232 | 12/1973 | Woods et al. | 318/786 |
| 3,970,908 | 7/1976 | Hansen et al. | 318/786 |

*Primary Examiner*—David Smith, Jr.
*Assistant Examiner*—Gene Z. Rubinson
*Attorney, Agent, or Firm*—Merriam, Marshall & Bicknell

[57] ABSTRACT

This disclosure relates to control apparatus and particularly to a triggered switch connected in a first or controlled circuit and a trigger device connected in a second circuit. AC currents flow through the first and second circuits and there is a changing phase angle between the currents. Further, the current level in the second circuit changes. When the phase angle is greater than a certain value and the current level in the second circuit is above a certain level, the trigger device triggers the switch and energizes the first circuit. At angles below the value and current levels below the certain level, the switch is not triggered. Thus, the changing phase angle may be utilized to control the first circuit. The triggered switch is a thyristor type of device such as a triac, and the trigger device is preferably a reed switch. The control apparatus is particularly useful in controlling the start winding of a single phase AC motor.

24 Claims, 12 Drawing Figures

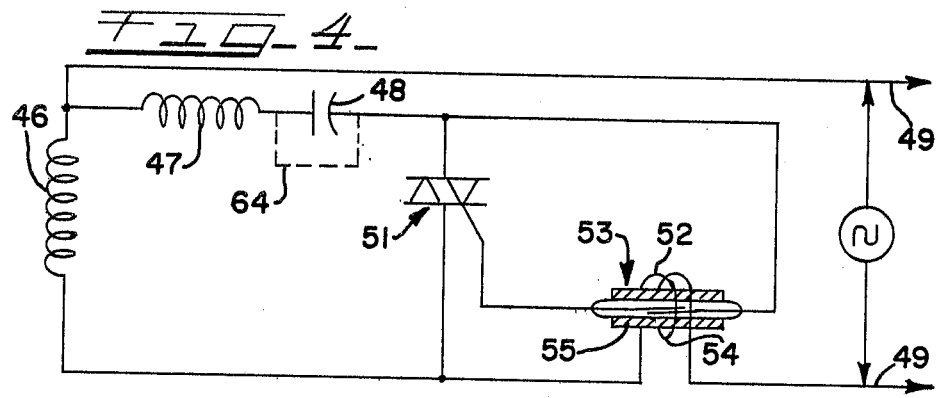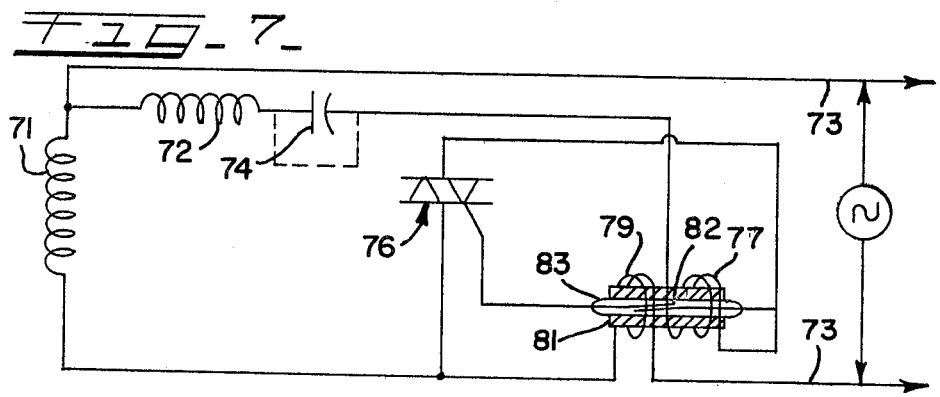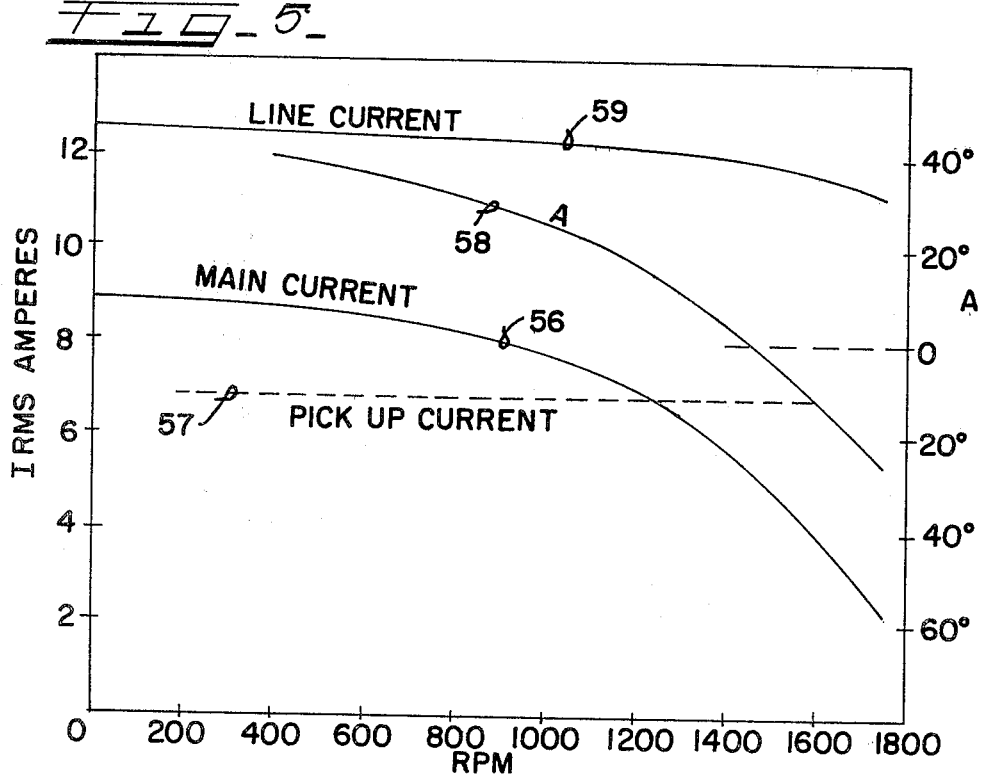

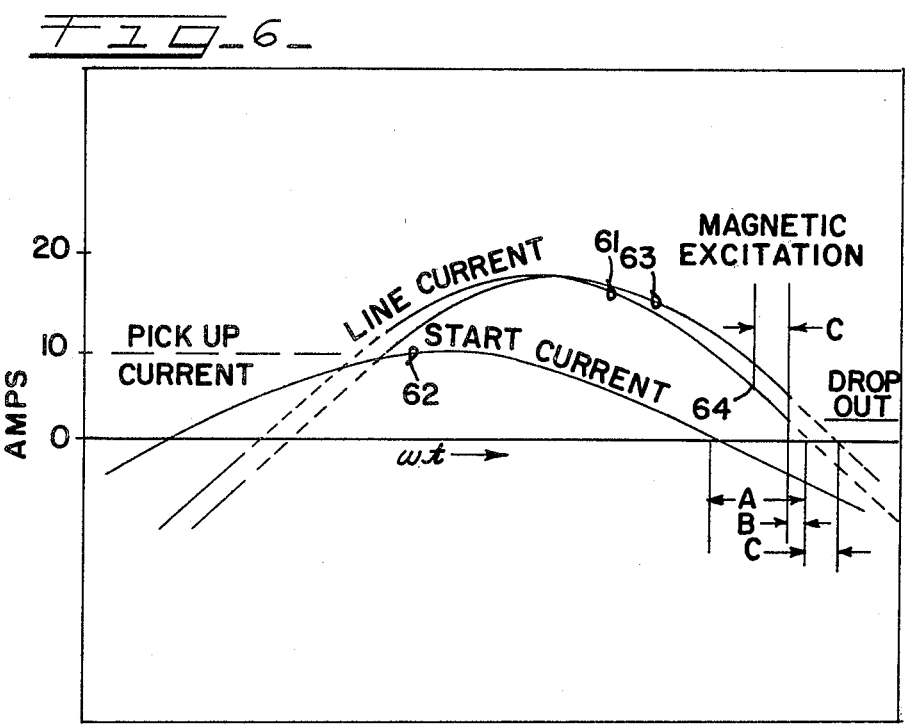
FIG-6-
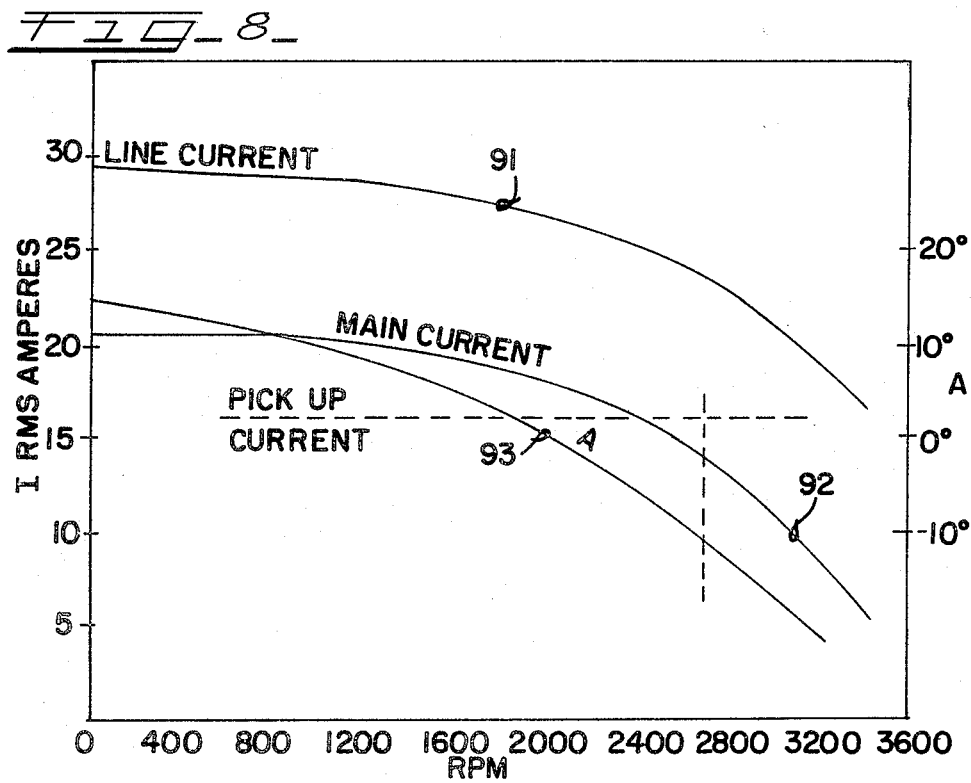
FIG-8-

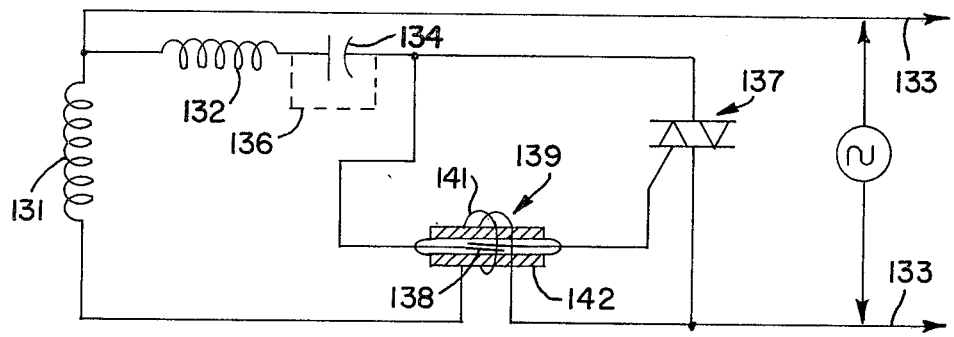
FIG_12_
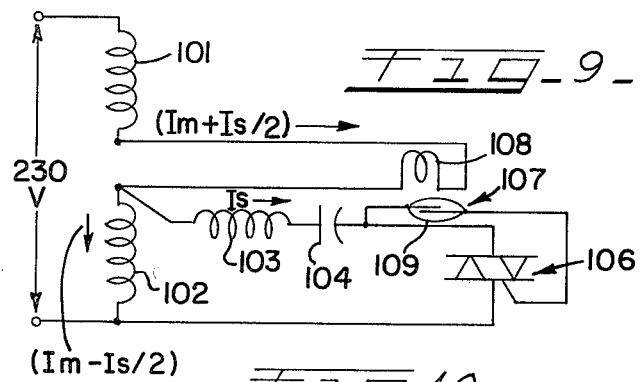
FIG_9_
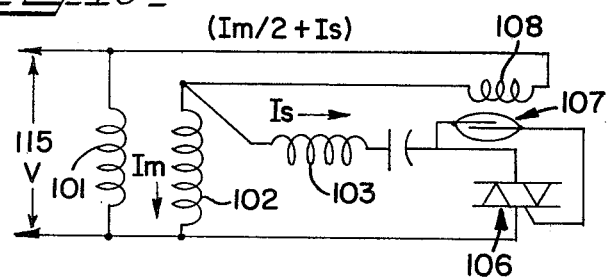
FIG_10_
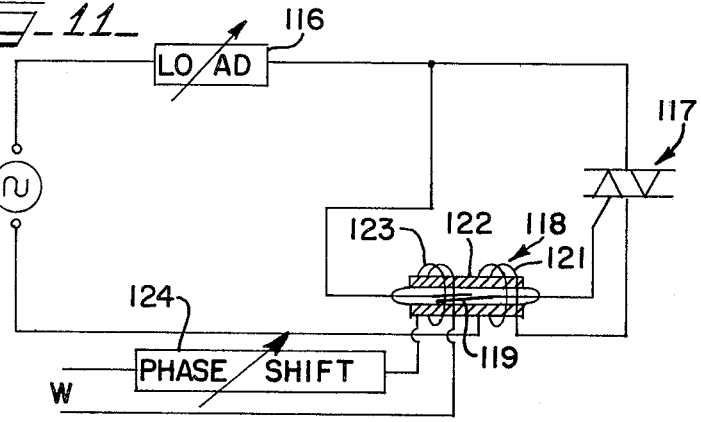
FIG_11_

CONTROL ARRANGEMENT FOR SINGLE PHASE AC SYSTEMS

A single phase AC motor includes a main winding and a start winding that usually is energized only during motor startup. A wide variety of arrangements have been provided in the past to disconnect the start winding when the motor reaches a certain speed, referred to as the cut-out speed, and to reconnect the start winding if the motor speed falls under heavy load conditions. Such arrangements have included centrifugal mechanisms, current relays, and, in recent years, solid state electronic circuits that respond to time or various motor operating parameters.

The prior art arrangements have been deficient in a number of respects. For example, the centrifugal mechanisms and relays include mechanical parts that are subject to wear over many years use, and arcing of the switch contacts may present a hazard in some environments. The solid state electronic circuits are relatively expensive and their dependability over many years use has not yet been proven.

It is a general object of the present invention to provide a new and improved control circuit that avoids the foregoing disadvantages.

Control apparatus in accordance with the invention comprises a triggered switch connected in a first or controlled circuit and a trigger device connected in a second circuit. AC currents flow through the first and second circuits and there is a changing phase angle between the currents. The current level in the second circuit also changes. When the phase angle between the currents in the two circuits is greater than a certain value and the current level in the second circuit is above a certain level, the trigger device triggers the switch and energizes the first circuit. At angles below the value and current levels below the certain level, the switch is not triggered. Thus, the changing phase angle may be utilized to control the first circuit.

Apparatus in accordance with the invention further comprises a single phase electric motor including main and start windings. The start winding circuit comprises the controlled or first circuit and the line current or the main winding current comprises the second circuit.

The invention may be better understood from the following detailed description taken in conjunction with the accompanying figures of the drawings, wherein:

FIGS. 4 to 6 illustrate a preferred form of the invention; and

FIGS. 7 to 12 illustrate alternate forms of the invention.

Figure 2:
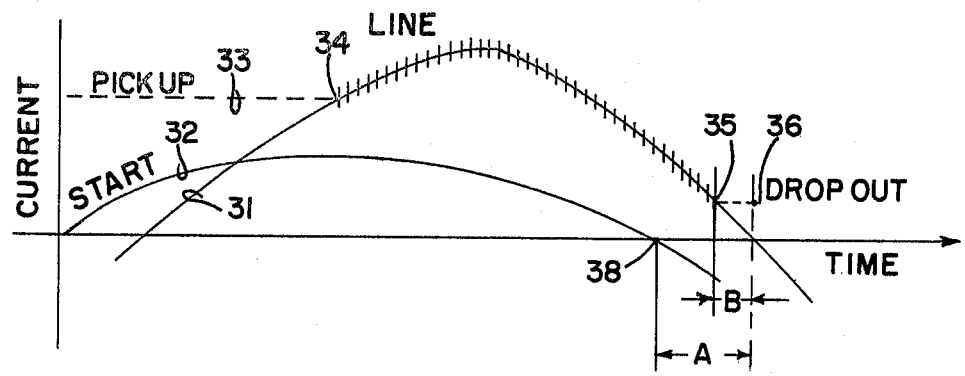
FIGS. 1 to 3 illustrate apparatus in accordance with the invention.
Figure 3:
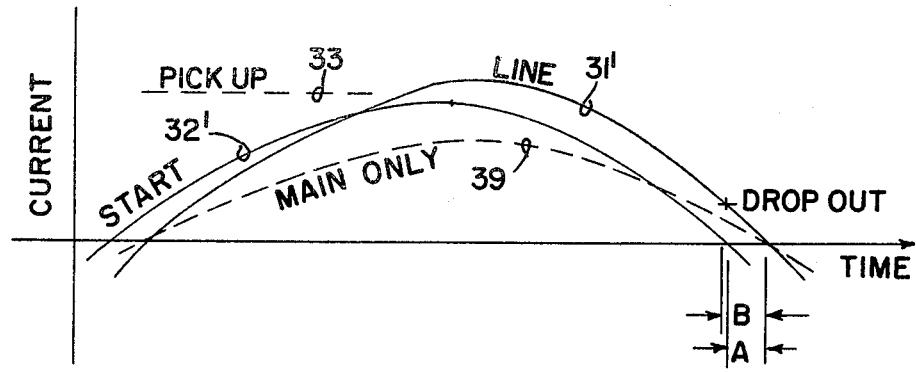
Figure 1:
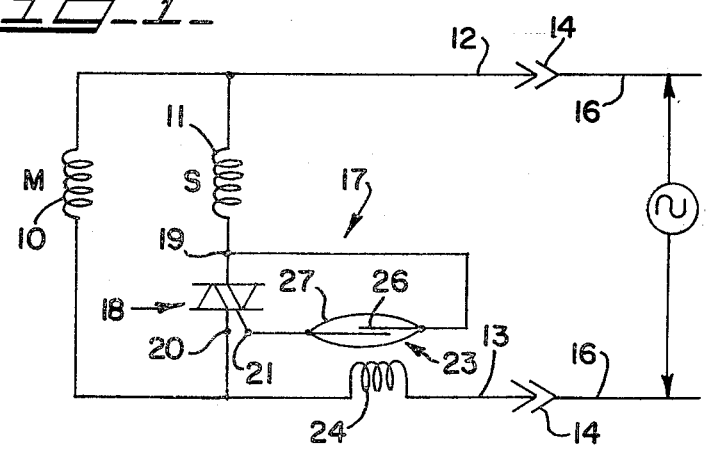

The circuit of FIG. 1 and the curves of FIGS. 2 and 3 illustrate the construction and operation of an AC motor including a circuit according to the invention. A single phase motor, which may be a capacitor start or a split phase, includes a main winding 10 and a start winding 11 that are connected across power leads 12 and 13. A connector 14 may be provided to connect the leads 12 and 13 to power lines 16 of a single phase AC power supply such as a 115 volt supply.

A control circuit 17 is provided to control energization of the start winding 11 when the leads 12 and 13 are connected to the AC supply. The circuit 17 comprises a triac 18 having power or main terminals 19 and 20 and a control or gate terminal 21. The main terminals 19 and 20 are connected in series with the start winding 11. A trigger device 23 is connected between the gate 21 and the terminal 19 and controls the triac trigger current. The trigger device comprises a reed switch including a coil or winding 24 and contacts 26 inside a sealed glass envelope 27. As is well known to those skilled in the art, magnetic excitation caused by current flow in the coil 24 above a "pick-up" level causes the contacts 26 to close, and once closed, the contacts 26 remain closed until the coil 24 current falls below a "drop-out" level. The reed switch has a relatively high pick-up to drop-out ratio, which means that the pick-up current level is substantially higher than the drop-out current level. When the contacts 26 are closed, trigger current is supplied to the gate 21 and the triac is triggered on for the remainder of the AC half cycle.

With reference to FIGS. 2 and 3, the curve 31 represents the line current in the leads 12 and 13 and the coil 24 when the start winding is connected in the circuit, and the curve 32 represents the start winding current, over one-half of an AC cycle. The numeral 33 indicates the read switch 23 pick-up current level. When the AC power is initially connected to the leads 12 and 13, at the beginning of the first AC half cycle the line current flows in the main winding 10 but not in the start winding 11 because the triac 18 is not on. Before the peak of the main winding current, it exceeds the pick-up current level 33 and the magnetic excitation of the coil 24 closes the contacts 26. Trigger current is then supplied to the triac 18 and it conducts for the remainder of the half cycle. The line current represented by the curve 31 is, of course, comprised of the sum of the main and start winding currents. The reed switch contacts 26 close at the point 34 (FIG. 2) on the curve 31 and open at the point 35 where the curve 31 intercepts the drop-out current level 36.

FIG. 2 illustrates the circuit operating characteristics at a relatively low motor speed, such as 800 rpm, for a motor having a normal operating speed of 1,800 rpm. It will be noted that at this speed the start winding current 32 leads the line current 31 by an angle A, and the zero crossing 38 of the start winding current occurs before the line current 31 reaches the drop-out point 35. Consequently, when the curve 32 enters the negative half cycle, the contacts 26 are still closed and the triac 18 is immediately retriggered. The point 35 occurs at an angle B before the zero crossing of the line current 31 and the contacts 26 are open between the point 35 and the time when the line current reaches the pick-up level in the next negative half cycle, but, of course, the triac continues to conduct through this period. At the next zero crossing when the start winding current again becomes positive, the foregoing events are again repeated and the triac is triggered immediately after the zero crossing because the contacts 26 are still closed.

It will be apparent from FIG. 2 that as long as the peak value of line current 34 exceeds the pick-up level 33 and the angle A is greater than the angle B, the triac will be retriggered after each zero crossing. The start winding current flows for essentially the full AC cycle, and the circuit is insensitive to the opening of the contacts 26 during part of the cycle. As the motor gains speed, the angle A decreases and the line current 31 drops, this drop also causing the angle B to increase slightly. FIG. 3 illustrates the conditions when the motor cut-out speed is reached, which may be at about 1,380 rpm. The angle A is less than the angle B, or in other words the start winding current crosses the zero line after the contacts 26 open. Consequently the triac 18 is not retriggered after this zero crossing. Without start winding current, the line current flowing through the coil 24 drops to the main winding only value represented by the dash line 39. The peak value of the line 39 is less than the pick-up level 33 and therefore the contacts 26 remain open for the full cycle. The motor then continues to gain speed to normal running speed, operating only on the main winding 10.

FIGS. 1 to 3 illustrate a simplified form of the invention, and FIGS. 4 to 6 show the construction and operation of a preferred (and more universal) form of the invention. A single-phase capacitor-start motor includes main and start windings 46 and 47 and a capacitor 48 connected in series with the start winding 47. Lines 49 connect the motor to an AC power supply. A triac 51 is connected in series with the winding 47 and the capacitor 48, and the gate of the triac 51 is connected to the contacts 52 of a reed switch 53. The coil 54 of the reed switch is connected in one of the power lines 49 leading to the windings 46 and 47. A shading coil 55, which may consist of a single short circuited turn, is looped around the envelope and the contacts of the reed switch 53, for the purpose to be described hereinafter.

FIGS. 5 and 6 illustrate the operating characteristics of a ¼ HP four-pole motor constructed as shown in FIG. 4. The main winding current curve 56 (FIG. 5) (the start winding 47 being open) is greater than the reed switch pick-up current level 57 (see FIG. 5) at motor speeds below about 1,240 rpm. The angle A, shown by curve 58, is the phase angle of the start winding current relative to the line current 59, and the start winding current leads the line current at motor speeds below about 1,500 rpm. As noted in FIG. 5, the current values are RMS.

FIG. 6 illustrates the instantaneous values of the line current 61 and start winding current 62 for a half cycle at a motor speed of approximately 800 rpm. The line current 61, of course, flows through the coil 54. The magnetic excitation 63 of the reed switch is offset from the line current 61 because of the lag produced by the shading coil 55. In the present example, the shading coil produces a lag angle C of approximately 9° in the magnetic excitation. The angles A and B shown in FIG. 6 are as described in FIG. 2. The reed switch drop-out level is approximately 45% of the pick-up level, and in the example being described, the line current 61 falls to this value at point 64 at approximately 15° before it crosses the zero line. However, because of the 9° lag in reed magnetic excitation that results from the action of the shading coil, the drop-out is delayed until 6° before the line current crosses the zero line. Angle B is therefore reduced by 9° to 6°.

As previously mentioned and as shown by the curve 58 in FIG. 5, the angle A decreases as the motor speed increases. When the motor speed increases to the point where the angle A is less than the angle B, the start winding current 62 crosses the zero line after the reed magnetic excitation reaches the drop-out level and therefore the triac 51 is not retriggered. The effect of the shading coil in reducing angle B by the shading coil lag angle C is to require the motor to attain a higher speed before angle A becomes less than angle B. Therefore the motor speed at which the triac is not retriggered is increased as a result of shading coil 55. The line current is then only the main winding current with the start winding disconnected. At this motor speed the main winding current 56 (FIG. 5) is less than the pick-up current 57 and therefore the triac is not triggered. The motor speed increases to normal running speed operating only on the main winding.

In the specific example described and illustrated in FIGS. 4 to 6, the running speed is about 1,770 rpm and the start winding 47 is cut out at approximately 1,380 rpm. At 1,380 rpm, the angle A is approximately 6°; the shading coil 55 introduces a lag of approximately 9° in the magnetic excitation as previously mentioned. As shown in FIG. 5, the main winding current 56 crosses the pick-up level 57 at approximately 1,240 rpm. If the motor slows down due to a heavy load, the motor will operate on the main winding only until it reaches 1,240 rpm. At this point, the triac is triggered at the peak of the AC cycle and then both the main and start winding currents flow through the coil 54. The motor then gains speed again and operates as during initial startup until the 1,380 rpm level is reached, and then the start winding is again cut out. If the heavy load persists, the motor may cycle between these two speeds, and a thermal cut-out switch is preferably provided to disconnect the motor in case it overheats.

The speed at which the start winding is disconnected is determined primarily by the pick-up to drop-out ratio of the reed switch, the motor characteristics, and the resistance of the shading coil. The cut out speed is secondarily affected by the pick-up current level of the reed switch. The pick-up value may be adjusted to obtain the desired operating characteristics for a particular motor design by the choice of the number of turns of the coil 54, the spacing of the coil turns and their position relative to the gap of the contacts 52. For a reed switch with a given pick-up to drop-out ratio, the desired cut out speed is obtained by selection of a suitable size shading coil, although for many applications no shading coil is required unless the desired cut out speed is critical.

The pick-up current level 57 of the reed switch is preferably set as high as possible but below the main current line 56 at zero speed and within the range of line voltages at which the motor is expected to operate. If the pick-up current 57 were substantially lower than the level shown in FIG. 5, the motor would still operate, however. For example, if the main current 56 were greater than the pick-up current 57 when the angle A decreased to less than B, the triac 51 would not be retriggered immediately after each zero crossing but it would be triggered later in each half cycle when the main current exceeds the pick-up current. The start winding would then be energized during part of each half cycle until the main winding current dropped with increasing speed to a value below the pick-up current.

While FIG. 4 illustrates a capacitor start motor, the invention is also applicable to a split-phase motor. In a split-phase motor, the capacitor 48 would be replaced by a conductor 64 shown in dashed lines in FIG. 4.

In some electric motor designs, the line current during startup drops more rapidly than in the design shown in FIGS. 4 to 6. To prevent the magnetic excitation from falling below the pick-up value before the angle A decreases to less than the angle B, the arrangement shown in FIG. 7 may be utilized. This arrangement includes a motor having main and start windings 71 and 72 connected to power lines 73. A capacitor 74 may be connected in series with the start winding 72. Also connected in series with the start winding are a triac 76 and a coil 77 of a reed switch 78. The reed switch 78 further includes a second coil 79 connected in a power line 73, a shading coil 81, and contacts 82 in a sealed envelope 83.

The arrangement shown in FIG. 7 is therefore the same as that shown in FIG. 4, except for the coil 77 which carries the start winding current. The coil 77 increases the amount of magnetic excitation during startup and thereby ensures that the reed switch contacts will close in each AC half cycle until the angle A is less than the angle B.

As is well known, the line voltage may vary by over 20 volts from the rated voltage, and such a variation has an effect on the cut-out speed. The arrangement shown in FIG. 7 also provides for operation as described, despite such a variation in line voltage.

It will be apparent from the foregoing description and the drawings that the control circuit responds to the phase displacement of the start winding current and cuts out the start winding when its current is nearly in phase with the line current. A latching type reed switch may be used in addition to or in place of the shading coil to delay the opening of the reed switch contacts to obtain the desired cut-out speed. With reference to FIGS. 1 and 8, assume that the reed switch 27 is a latching type and that the motor is a two-pole split phase motor having a running speed of approximately 3,600 rpm and a desired cut-out speed of approximately 2,700 rpm. In a latching type relay, once the contacts close in a half cycle, they do not open until the magnetic excitation force reverses. When used without a shading coil, the opening of the reed contacts in a latching type reed, at AC excitation levels employed in the motor start switch, is typically at about 0° to 3° after the zero crossing of the coil current, and this angle remains relatively constant with modest changes in the current level in the coil.

With reference to FIG. 8, the line current and main current curves 91 and 92 are similar to the curves 59 and 56 in FIG. 5, but the phase angle curve 93 is quite different from the curve 58. At the desired cut-out speed of about 2,700 rpm, the start winding current lags the line current by approximately 12°. The provision of the shading coil to produce a lag of about 10° and the use of a latching reed switch delays the opening of the reed contacts to about 12° after a coil current zero crossing and the cut-out speed will be approximately independent of variations in the line voltage.

A latching reed switch may also be used with capacitor start motors, but it may provide a cut-out speed that is somewhat higher than is usually desired.

A control circuit of the character described herein is also usable with dual voltage capacitor start motors. FIG. 9 shows such a motor connected for 230 V operation and FIG. 10 shows the same motor connected for 115 V operation. The motor includes two main windings 101 and 102, a start winding 103, and a capacitor 104 connected in series with the start winding. In FIG. 9, the main windings are connected in series whereas in FIG. 10 they are connected in parallel. In both arrangements the start winding 103 is in parallel with the main winding 102.

The control circuit includes a triac 106 connected in series with the start winding 103, and a reed switch 107 having a coil 108 and contacts 109. The contacts 109 are connected to the gate of the triac 106 and the coil 108 is connected to the main windings 101 and 102.

Assuming that the main windings operate as a perfect autotransformer in the FIG. 9 connection, the main winding current Im (with start circuit open) is equal to Im in the FIG. 10 connection. However, the start winding current Is in the FIG. 10 connection is twice the start winding current Is reflected by transformer action into coil 108 in the FIG. 9 connection. In FIG. 9, the reed coil 108 current equals Im+Is/2 and in FIG. 10, the reed coil current equals Im+Is.

In both the FIG. 9 and FIG. 10 connections, the phase of the start winding current changes relative to the current through the reed coil 109. It leads the coil current at low speeds and reaches an in-phase condition at a higher speed. The circuit operates to cut out the start winding when the two currents are nearly in phase, as described in connection with the previous motor arrangements, and the cut-out speed for both connections is essentially identical. Again, a shading coil and/or a latching reed switch may be provided to obtain the desired cut-out speed.

FIGS. 1 to 10 show the invention as applied to electric motors, and FIG. 11 shows a more general application of the invention. FIG. 11 shows a load 116 to be controlled, connected to an AC power supply and in series with a triac 117. The contacts 119 of a reed switch 118 are connected to the gate of the triac, and a reed switch coil 121 is connected to carry the line current. A shading coil 122 may be provided and a control coil 123 is also provided. The coil 123 is connected to a reference AC current supply and a variable phase shifting circuit 124 may be provided.

The phase of the reference current in the coil 123 must change relative to the line current in the triac 117. If the line current phase is fixed, the circuit 124 may be utilized to shift the phase, and if the reference current phase is fixed the load 116 may be a type that changes the phase of the line current. Further, the magnitude of the reference current must be less than the pick-up value of the reed switch during the time that the circuit is to be open. The magnitude of the line current must also be less than the pick-up value at this time.

When the FIG. 11 circuit is initially energized, the reference current must be momentarily increased above its normal level and above the level necessary to close the contacts 119. This may be accomplished as by making the supply voltage variable or by providing a variable resistance in series with the coil 123. Once the reed contacts are closed and the triac is triggered, the magnetic excitation by the two coils 121 and 123 closes the contacts 119 and the circuit operates as previously described. When the relative phase angle of the line and reference currents changes, the triac is not triggered when the triac current crosses zero after the contacts have opened, and the load 116 circuit is then disconnected.

FIG. 12 illustrates still another control arrangement including a triac and a reed switch. The main and start windings 131 and 132 of a single phase motor are connected to power lines 133. The motor may include a capacitor 134 for capacitor start operation or the capacitor may be shunted (line 136) for split phase operation. A triac 137 is connected in series with the start winding 132, and the gate is connected to the contacts 138 of a reed switch 139. The coil 141 of the reed switch is connected in seres with the main winding 131 and only the main winding current flows through the coil 141. Again, a shading coil 142 is provided around the reed switch, and the shading coil 142 is of sufficient size to cause the magnetic excitation to lag enough that the contacts 138 are closed during the zero crossing of the start winding 132 current at all speeds for which the main winding 131 current exceeds the pick-up value of the reed switch 139, when the triac is triggered. As the motor speed increases during startup, the main winding current drops as shown in FIG. 5. The start winding 132 is cut out when the magnetic excitation produced by the main winding 131 current drops below the pick-up value of the reed switch. In the circuit of FIG. 12, cut-out speed is determined not by relative phase angles but by main current magnitude, and of course the number of turns of the coil 141, their location and spacing may be selected to obtain the desired cut-out speed. Further, the reed switch 139 may be a latching-type in order to keep the contacts closed for the required period.

It will be apparent from the foregoing that novel and useful control circuits have been provided. A thyristor type device, which is preferably a triac but may be an other arrangement such as back-to-back SCRs, is connected in a controlled circuit and a trigger device, preferably a reed switch, controls actuation of the thyristor. The phase offset of the triac and reed switch currents causes the triac to be triggered at the beginning of each half cycle, which of course is highly advantageous. While a change in the relative phases is preferably utilized to perform the control function, the magnitude of the reed switch current also may be utilized. When used as a start winding control circuit, various means may be used to obtain the desired cut-out speed.

We claim:

1. Apparatus for controlling the start winding of an AC motor comprising a main winding and a start winding connected in parallel, power lines connected to said windings and adapted to be connected to an AC power supply, bidirectional thyristor means connected in series with said start winding, and current responsive trigger means connected to said thyristor means for triggering said thyristor means to conduction, and said trigger means being connected to said power lines and responding to current flow though said lines and said motor windings.

2. Apparatus as in claim 1, wherein said trigger means comprises a reed switch including contacts, a coil, and a shading coil.

3. Apparatus as in claim 1, wherein said trigger means comprises a latching type reed switch.

4. An AC motor comprising a main winding circuit and a start winding circuit connected in parallel, power lines adapted to be connected to an AC power supply and to supply main winding current and start winding current, bidirectional thyristor means connected in said start winding circuit and operable to conduct said start winding current by trigger current supplied thereto, and current responsive trigger means connected to said thyristor means to supply said trigger current and including excitation current carrying means connected in said power lines and receiving start winding current and main winding current, said trigger means having pick-up and drop-out excitation current levels and supplying said trigger current during that portion of an AC half cycle lying between the point at which said excitation current first exceeds said pick-up level and the point at which said excitation current decreases to below said drop-out level, and said thyristor means being triggered to conduction at the beginning of a half cycle of said start winding current when said beginning coincides in time with said portion of a half cycle and when the peak value of said excitation current exceeds said pick-up level.

5. Apparatus as in claim 4, wherein said trigger means comprises a reed switch including contacts, a coil connected in said power lines, and a shading coil.

6. Apparatus as in claim 4, wherein said trigger means comprises a latching reed switch.

7. Apparatus as in claim 4, wherein said trigger means comprises a reed switch including contacts, a first coil and a second coil, said first coil being connected in said power lines and said second coil being connected to carry said start winding current.

8. Apparatus as in claim 7, wherein the phase of said start winding current leads said excitation current by a phase angle at low motor speeds and said angle decreases as said motor speed increases, and said thyristor means is not triggered to conduction when said phase angle decreases to where said beginning is not in time coincidence with said portion of a half cycle.

9. Apparatus as in claim 4, wherein said thyristor means comprises a reed switch including a triac, and said trigger means comprises contacts connected in said start winding circuit and an excitation coil connected in said power lines.

10. Apparatus for controlling an AC motor having a main winding circuit and a start winding circuit connected in parallel, and power lines adapted to connect with an AC power supply and to supply main winding and start winding alternating currents, said apparatus comprising a triac adapted to be connected in said start winding circuit and to be triggered to conduct said start winding current by trigger current supplied thereto, a reed switch having contacts and an excitation coil, said contacts being connected to said triac to supply said trigger current, said reed switch having pick-up and drop-out excitation current levels in said coil and supplying said trigger current during a portion of each AC half cycle when said excitation current in said coil exceeds said pick-up level, and at motor speeds below the start winding cut-out speed said triac being triggered to conduction at the beginning of a half cycle of said start winding current when said beginning coincides in time with said portion of a half cycle and when said excitation current exceeds said pick-up level, said coil being adapted to respond to current flow through at least one of said motor windings, said excitation current in said coil producing magnetic excitation, and further including a shading coil adjacent said contacts for producing a time lag in said magnetic excitation.

11. Apparatus as in claim 9, wherein said reed switch comprises a latching type, and said drop-out excitation current level occurs approximately when said excitation current changes polarity.

12. Apparatus for controlling an AC motor having a main winding circuit and a start winding circuit connected in parallel, and power lines adapted to connect with an AC power supply and to supply main winding and start winding alternating currents, said apparatus comprising a triac adapted adapted to be connected in said start winding circuit and to be triggered to conduct said start winding current by trigger current supplied thereto, a reed switch having contacts and an excitation coil, said contacts being connected to said triac to supply said trigger current, said reed switch having pick-up and drop-out excitation current levels in said coil and supplying said trigger current during a portion of each AC half cycle when said excitation current in said coil exceeds said pick-up level, and at motor speeds below the start winding cut-out speed said triac being triggered to conduction at the beginning of a half cycle of said start winding current when said beginning coincides in time with said portion of a half cycle and when said excitation current exceeds said pick-up level, said coil being adapted to be connected to said power lines and to respond to line current flow, the phase of said line current in said coil lagging by a phase angle the phase of said start winding current in said triac at relatively low motor speeds and said angle decreasing as the motor speed increases, and said triac not being triggered to conduction when said angle decreases to where said beginning does not coincide with said portion, and a second excitation coil on said reed switch, said second excitation coil being adapted to carry said start winding current.

13. Apparatus as in claim 9, wherein said motor is a dual-voltage type and includes two main windings.

14. Apparatus for use in an AC system, comprising a first circuit and a second circuit, power lines connected to said first and second circuits for supplying AC currents thereto, a triggered switch connected in said first circuit, a reed switch including contacts, a first coil and a second coil, said contacts being connected to said triggered switch to actuate said switch, said first coil being connected in said first circuit and said second coil being connected in said second circuit, means in one of said first and second circuits for changing the relative phases and current levels of the AC currents therein, said contacts triggering the switch and energizing the first circuit only when the phase angle between the currents in the two circuits is greater than a certain value and the current level in the second circuit is above a certain level.

15. Apparatus as in claim 14, wherein said reed switch further includes a shading coil.

16. An AC motor comprising a main winding circuit and a start winding circuit connected in parallel, power lines adapted to be connected to an AC power supply and to supply main winding current and start winding current, bidirectional thyristor means connected in said start winding circuit and operable to conduct said start winding current by trigger current supplied thereto, and a reed switch including contacts connected to said thyristor means to supply said trigger current and including an excitation coil connected in said main winding circuit and receiving said main winding current, said reed switch further including a shading coil adjacent said contacts, said trigger means having pick-up and drop-out excitation current levels and supplying said trigger current during that portion of an AC half cycle lying between the point at which said excitation current first exceeds said pick-up level and the point at which said excitation current decreases to below said drop-out level, and said thyristor means being triggered to conduction at the beginning of a half cycle of said start winding current when said beginning coincides in time with said portion of a half cycle and when the peak value of said excitation current exceeds said pick-up level.

17. Apparatus as in claim 16, wherein said reed switch is a latching type.

18. A start winding cut-out circuit for a single phase AC motor including a main winding and a start winding connected in parallel and power lines for connecting the windings to an AC power supply, the main winding and line currents decreasing as the motor speed increases and the phase of the start winding current changing relative to the line current, the start winding current leading the line current at relatively low speeds and changing to a lagging condition at higher motor speeds, said circuit comprising a triac adapted to be connected in series with said starting winding, a reed switch having reed contacts and an exciting coil, said contacts being connected to supply trigger current to said triac when closed, said coil being adapted to be connected in said power lines to respond to current flow through said main and start windings, said reed switch having pick-up and drop-out levels of current flow through said coil and said coil current producing magnetic excitation for operating said contacts, and at motor speeds below the start winding cut-out speed the peak value of the coil current being greater than the pick-up level and said start winding current changing from one AC half cycle to the next AC half cycle while said reed contacts are closed.

19. A circuit as in claim 18, wherein said reed switch further includes a shading coil adjacent said exciting coil.

20. A circuit as in claim 18, wherein said reed switch is a latching type.

21. A circuit as in claim 18, wherein said reed switch further includes a second exciting coil adapted to be connected in series with said start winding.

22. An AC motor comprising a main winding circuit and a start winding circuit connected in parallel, power lines adapted to be connected to an AC power supply and to supply main winding current and start winding current, bidirectional thyristor means connected in said winding circuit and operable to conduct said start winding current by trigger current supplied thereto, and a latching type reed switch including contacts connected to said thyristor means to supply said trigger current and including as excitation coil connected in said main winding circuit and receiving said main winding current, said trigger means having pick-up and drop-out excitation current levels and supplying said trigger current during that portion of an AC half cycle lying between the point at which said excitation current first exceeds said pick-up level and the point at which said excitation current decreases to below said drop-out level, and said thyristor means being triggered to conduction at the beginning of a half cycle of said start winding current when said beginning coincides in time with said portion of a half cycle and when the peak value of said excitation current exceeds said pick-up level.

23. In an AC motor including a main winding and a start winding connected in parallel, said windings being adapted to be connected by power lines to an AC power supply whereby main winding current and start winding current flow through said windings at motor speeds below a start winding cut-out speed, said start winding current leading the line current in said power lines by a relatively large phase angle at relatively low motor speeds and said phase angle decreasing as the motor speed increases, the improvement comprising bidirectional thyristor means connected in series with said start winding and receiving said start winding current at said low speeds, and means connected in said power lines and receiving said line current and connected to said thyristor means for triggering said thyristor means to conduction at a predetermined phase angle between said start winding current and said line current.

24. Apparatus as in claim 1, wherein said thyristor means comprises a triac and said trigger means comprises a reed switch.

* * * * *

UNITED STATES PATENT AND TRADEMARK OFFICE
CERTIFICATE OF CORRECTION

PATENT NO. : 4,307,327
DATED : December 22, 1981
INVENTOR(S) : AUGUST L. STREATER and JOHN A WHITNEY It is certified that error appears in the above-identified patent and that said Letters Patent are hereby corrected as shown below:

In Claim 9, that portion reading:

"comprises a reed switch including a triac, and said trigger means comprises contacts"

should read:

--comprises a triac, and said trigger means comprises a reed switch including contacts--

Signed and Sealed this

Twentieth Day of April 1982

[SEAL]

Attest:

GERALD J. MOSSINGHOFF

*Attesting Officer*     *Commissioner of Patents and Trademarks*